United States Patent [19]

Ujiie et al.

[11] Patent Number: 5,027,154
[45] Date of Patent: Jun. 25, 1991

[54] METHOD OF STORING AND DISPLAYING ERROR INFORMATION IN PHOTOGRAPHIC PRINTER

[75] Inventors: Yoichi Ujiie; Hiroyuki Isozaki, both of Kanagawa, Japan

[73] Assignee: Fuji Photo Film Co., Ltd., Kanagawa, Japan

[21] Appl. No.: 521,499

[22] Filed: May 10, 1990

[30] Foreign Application Priority Data

May 23, 1989 [JP] Japan .................................. 1-129676

[51] Int. Cl.[5] ...................... G03B 27/32; G06F 11/00
[52] U.S. Cl. .................................... 355/205; 355/206; 355/77
[58] Field of Search ............................... 355/203–209, 355/77

[56] References Cited

U.S. PATENT DOCUMENTS

| | | | |
|---|---|---|---|
| 4,322,813 | 3/1982 | Howard et al. | 355/209 |
| 4,339,657 | 7/1982 | Larson et al. | 355/206 |
| 4,589,080 | 5/1986 | Abbott et al. | 355/208 |
| 4,947,397 | 8/1990 | Sobel et al. | 355/205 |

Primary Examiner—L. T. Hix
Assistant Examiner—D. Rutledge
Attorney, Agent, or Firm—Sughrue, Mion, Zinn, Macpeak & Seas

[57] ABSTRACT

In a printer-processor, if an error occurs during execution of a print process, a corresponding error message is displayed in a display unit, and the error message and the time at which the error occurs are stored sequentially in a memory. In response to an instruction, the errors that have occurred are displayed one after another in the order stored, or in the reverse order to review the record of past errors.

8 Claims, 4 Drawing Sheets

FIG. 4

E48    TEMPERATURE OF PROCESSING SOLUTION IS UNSTEADY

W08    CORRECT NEGATIVE POSITION

FIG. 5

SERIAL NUMBER      TIME

```
No. 01  '89 05/20  14:17
E48  TEMPERATURE OF PROCESSING
```

ERROR MESSAGE

METHOD OF STORING AND DISPLAYING ERROR INFORMATION IN PHOTOGRAPHIC PRINTER

BACKGROUND OF THE INVENTION

The present invention relates to a method of storing and displaying error information so as to utilize the information for maintaining a photographic printer.

In current photographic printers an error message is indicated in a display attached to the photographic printer each time a fault or trouble occurs in the printer. Some kinds of errors, caused by faults such as burn-out of a printing lamp, need preparation or adjustment which can be carried out only by a maintenance service staff of the manufacturer. With such errors, the service staff asks the operator what kind of error has occurred. The staff then tries to fix the printer based on the operator s explanation. Also, in routine maintenance, the service staff usually requires the operator to explain the operational condition of the printer before checking or adjusting each section of the printer.

In order to fix the printer completely, it is important to know the record of past errors, namely the history of errors besides the present error. However, most operators cannot remember all the past error messages, or cannot explain past errors accurately.

SUMMARY OF THE INVENTION

In view of the foregoing, it is one object of the invention to provide a method of storing and displaying error information in a photographic printer, so that the record of past errors can be reviewed during repair or routine maintenance.

The foregoing and other objects are accomplished by sequentially storing, in a memory, information about each error which has occurred in operating a photographic printer, and reading out the error information sequentially from the memory so as to display the error information during repair or maintenance of the photographic printer.

The error information includes all or part of the error message the time at which the error occurred and so forth. Therefore, the operator and the service staff can know precisely the details of the past errors, including when the errors occurred.

BRIEF DESCRIPTION OF THE DRAWINGS

Other objects and advantages of the present invention will become apparent from the following detailed description when read in conjunction with the accompanying drawings, wherein:

FIG. 4 shows two examples of the error message; and

FIG. 5 shows an example of the error information that is stored during print processing and is displayed in maintenance.

DETAILED DESCRIPTION OF THE PREFERRED EMBODIMENT

Figure 1:
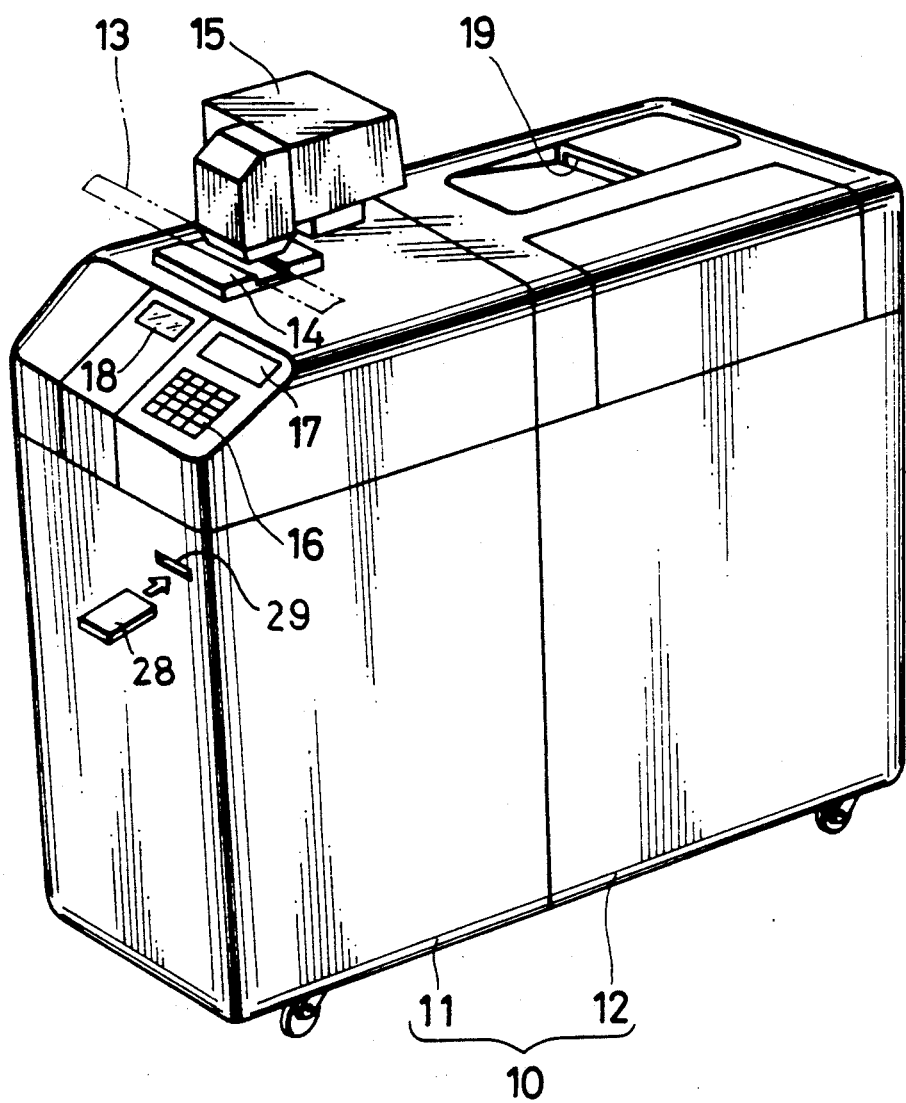
FIG. 1 is a perspective view of a printer-processor embodying the method of the present invention.

FIG. 1 shows a printer-processor 10, which includes a printer section 11 for printing an image recorded on a negative film onto a color photographic paper and a processor section 12 for photographically processing the exposed color paper. At the top of the printer section 11, there are provided a film carrier 14 for holding a negative film 13 and a lamp housing 15 in which a printing lamp (not shown) for illuminating the negative film 13. The printer section 11 also has a keyboard 16 for inputting data and instructions, a display 17 for indicating various messages, entered data and the like, and a frame window 18 for observing the frame of the negative film that is placed in a print station under the lamp housing 15. The messages displayed in the display 17 include various error messages indicating the location and type of an error which occurs or which has occurred operational instructions for teaching operational steps, and so forth.

Figure 2:
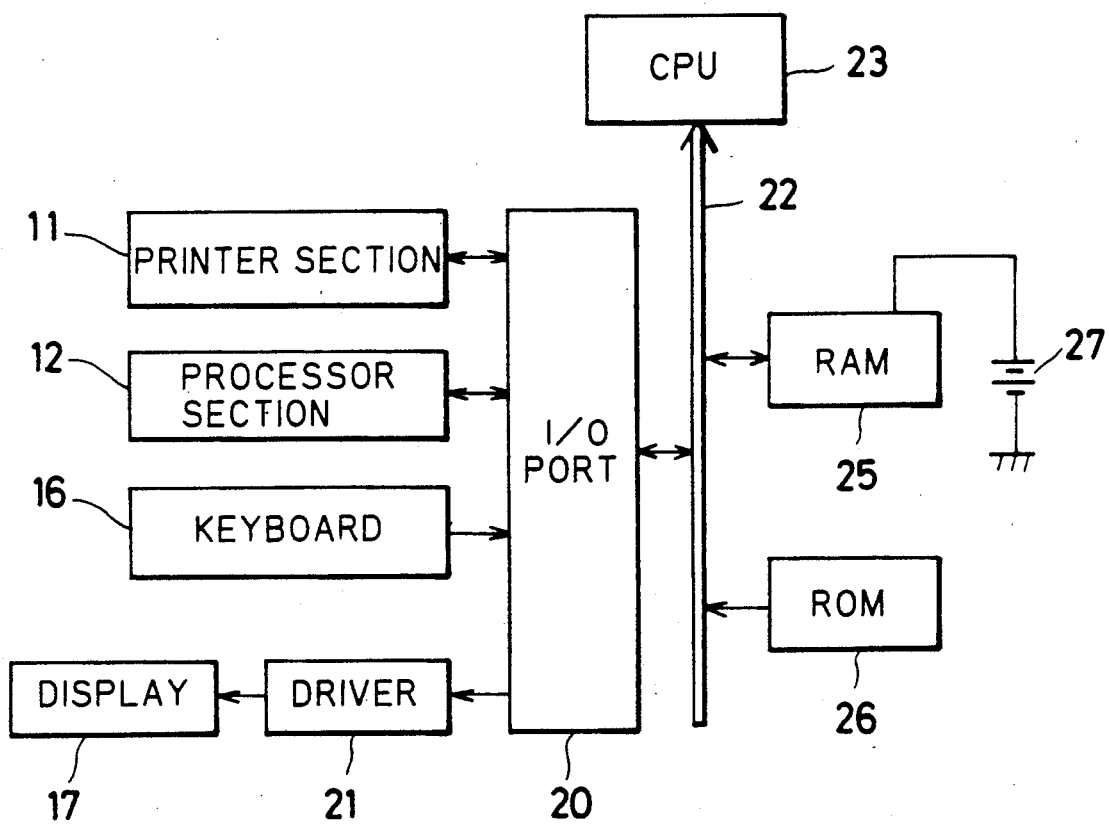
FIG. 2 is a functional block diagram of the printer-processor of FIG. 1.

As shown in FIG. 2, the printer section 11, the processor section 12 and the keyboard 16 are connected to an input/output (I/0) port 20 to which a driver 21 for driving the display 17 is connected. The I/O port 20 is connected to a central processing unit (CPU) 23 through a bus line 22, through which a random access memory (RAM) 25 and a read only memory (ROM) 26 also are connected to the CPU 23.

The RAM 25 stores not only input data, but also error messages and other data, such as condition setup data, which have an important influence on the quality of finished prints. These error messages and setup data are stored in the RAM 25 along with time data indicating the time and date at which the errors occurred or the setup data were entered. Therefore, the operator can see the time and sequence of the error occurrence and those of the setup data entry. Since it generally is sufficient, to effect proper repairs, to review the record of the past 100 errors, the oldest record is deleted when there are more than 100 errors in the history. The RAM 25 further is connected to backup batteries 27 for keeping the data stored in the RAM even if an unexpected voltage-break occurs. The ROM 26 stores a control program, arithmetic and logic formulas for calculating print-exposure value, etc.

Figure 3:
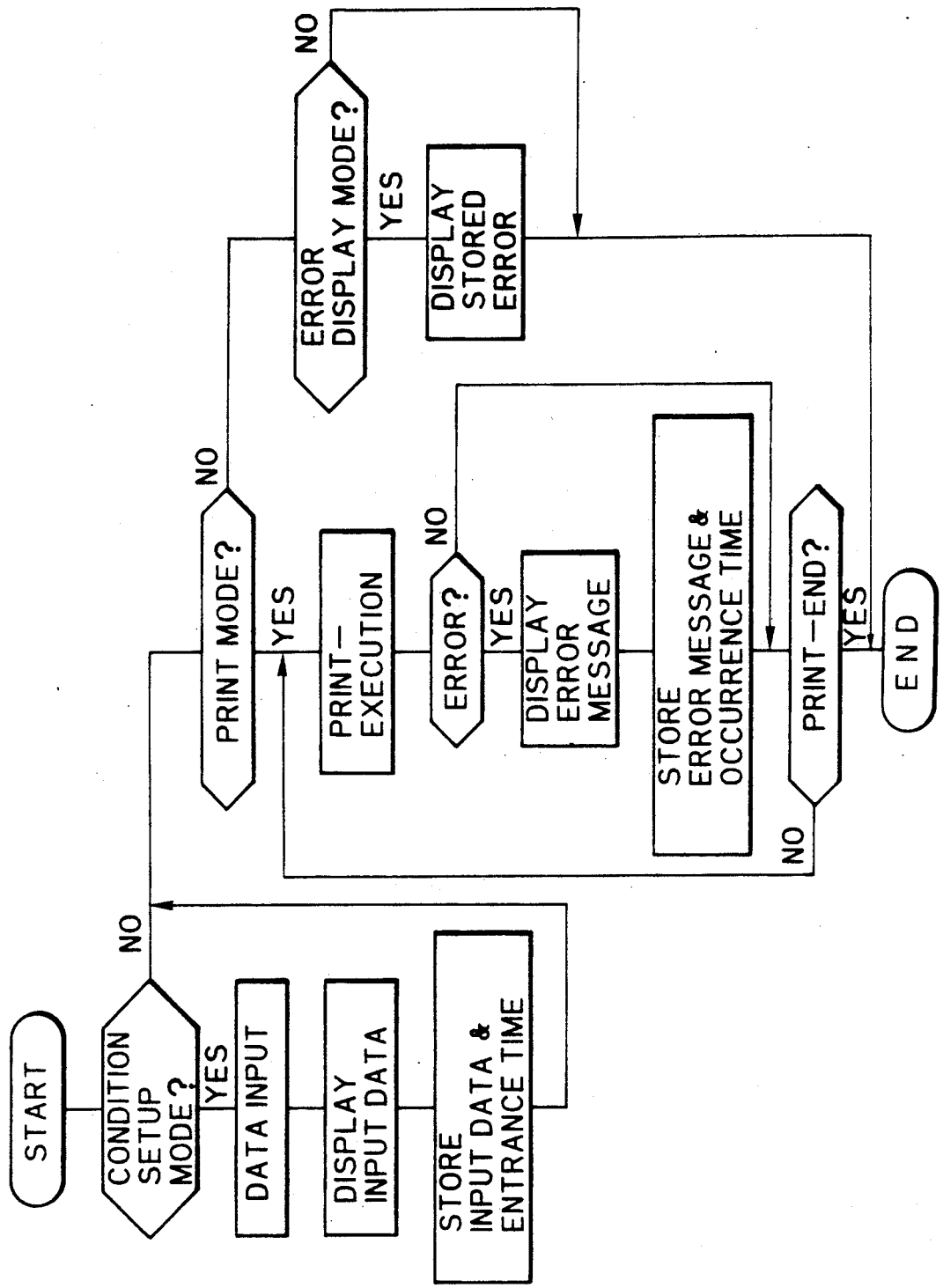
FIG. 3 is a flow chart showing a sequence of the operation of the printer-processor according to an embodiment of the present invention.

The operational sequence of the photographic printer now will be described with reference to the flow chart in FIG. 3.

Upon turning a power switch (not shown) of the printer-processor, various modes are displayed with their corresponding index numbers on the display 17. At the installation of the printer-processor 10, all conditions are to be set up in each item, whereas a necessary one of these items is selected to set up the condition thereof for maintenance. Data entered or measured for setting up the condition are stored in the RAM 25 along with the time and date at which the data were entered or measured.

When the operator selects a condition setup mode by operating appropriate arithmetic keys on the keyboard 16, first a message asking whether the voltage of the printing lamp is to be set up appears on the display 17. Then, the operator selects the lamp voltage setup mode and enters a reference lamp voltage through the keyboard 16. This lamp voltage is stored in the RAM 25 together with the time and date of its storage.

Next, messages concerning calibration are displayed. If the calibration is required, the operator places an unexposed and developed negative film in the film carrier and instructs the apparatus to start calibration, and the color of the film itself is subjected to color separation. Measured values are indicated in the display 17 and are stored in the RAM 25, wherein the measured values and data of when the value is measured also are written in a memory area for storing error information (the error message and time data of the error, including the serial number thereof).

In the same manner as above, the operator sets, in serial fashion, a normal density control-negative, an over density control-negative and an under density control-negative in the film carrier 14 in accordance with the displayed messages, so as to measure the respective color separation values. The measured values and corresponding time data also are stored in the RAM 25. Thereafter, various kinds of balance correction values, such as master balance values common to any printing, and respective balance values varied in accordance with the used color paper, negative film and printing lens, are entered. At the end, the normal density control-negative again is placed in the film carrier 14 to effect a ring-around exposure, so as to make several prints of the control-negative under a series of different exposure conditions. The operator selects the best one of these prints and inputs the number of the selected print. The balance values effective to the presently set negative type then are corrected based on the balance correction values set for the selected print.

Upon selecting a print mode, a negative image of the negative film 13 set in the film carrier 14 is printed on the color paper in a conventional manner. The print-exposed color paper is fed to the processor section 12 for the photographic processing, and then is cut into individual prints. These prints are ejected through a slot 19. If an error occurs during execution of the print-processing, a corresponding error message is indicated in the display 17 and, at the same time, the message and time of occurrence of the error are stored in the RAM 25 as the error information.

The error messages can be grouped into two types: one type indicates a fault that needs remedy or adjustment of the printer-processor; the other type is a warning message indicating an operational error. Examples of these two types of error messages are shown in FIG. 4, wherein "E" represents the need for remedy or adjustment, and "W" represents the need for correct operation. The numbers displayed beside the alphabet are index numerals according to which the detailed explanations of the error messages of each group are written sequentially in an instruction manual. Therefore, the operator can see easily what steps should be taken to correct the situation. If the message indicates that the present error needs remedy by maintenance service staff, the operator should contact the manufacturer.

The maintenance service staff selects an error display mode by appropriately keying in remedial maintenance or in routine maintenance. In the error display mode, setup data and stored error messages are displayed, one after another, from the latest to the oldest. Although the display 17 can indicate various messages including the error messages at most in two lines in a print mode or condition setup mode, only the first line of each error message is stored in RAM 25 and displayed in the second line of the display 17 in the error display mode because in this mode the serial number of the error, as well as the time and date of the occurrence thereof, are displayed in the first line.

The service staff diagnoses whether the condition setup is carried out according to a proper procedure, whether the setup condition itself is proper, and where the fault or poor adjustment occurs, with reference to the records of the errors, and the records of the procedure of the setup operation as well as the setup data. Based on the results of the diagnosis, the staff puts the printer-processor in optimum condition, for example, by revising the setup condition, or by replacing or adjusting the wrong parts.

Although the error information is read out from the latest to the oldest in the above embodiment, it may be possible to read out the information from the oldest to the latest. Therefore, it is preferable to provide a message asking the user to select a read-out sequence of the error information before displaying in the error display mode.

The error information stored in the RAM 25 can be registered in an LSI card 28 which can be adopted through an inlet 29 to a card reader (not shown) built in the printer-processor 10. In this way, the maintenance staff can collect error information concerning a large number of printer-processors, making it possible to cope with the essential cause of the fault or the operational mistake. It may be possible to store the error information directly in such a LSI card.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A method of storing and displaying error information in a photographic printer, said method comprising the steps of:
   storing error information including the content of an error and the time of occurrence thereof in a memory when an error occurs during operation of the photographic printer;
   reading out said error information from said memory in an order of occurrence in an error display mode; and
   displaying said error information on a display means.

2. A method as defined in claim 1, wherein said order of occurrence is from a most recent error to a least recent error.

3. A method as defined in claim 1, wherein said order of occurrence is from a least recent error to a most recent error.

4. A method as defined in claim 1, wherein said error information stored in said memory is stored in an LSI card.

5. A method as defined in claim 1, wherein the content of said error is an error message indicating a brief explanation of the error and an index referring to the detailed explanation of the error in an instruction manual.

6. A method as defined in claim 5, wherein a serial number indicating the order of occurrence of an error is displayed together with the content of the error.

7. A method as defined in claim 6, wherein said display means displays two lines of information, said serial number and said time of occurrence being displayed in the first line, and said index and said error message being displayed in the second line.

8. A method as defined in claim 7, wherein only the first line of said error message is displayed when said error message is more than one line long.

* * * * *